June 28, 1966  T. J. MORIN ETAL  3,258,573
WELDING AND FORMING METHOD AND APPARATUS
Filed June 13, 1963  3 Sheets-Sheet 1

INVENTORS
THEODORE J. MORIN
GEORGE R. PEACOCK
BY
Blair E. Buckles
ATTORNEYS

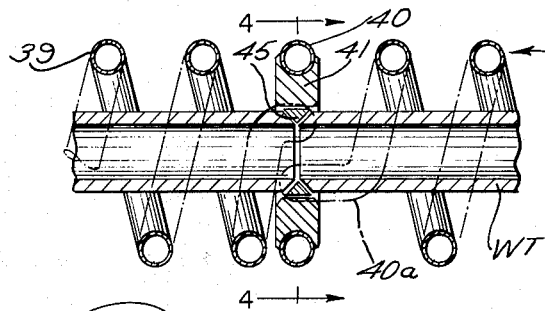
FIG. 3
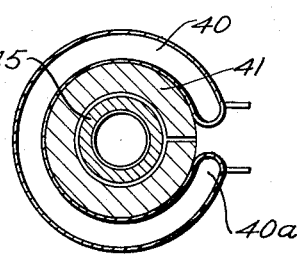
FIG. 4
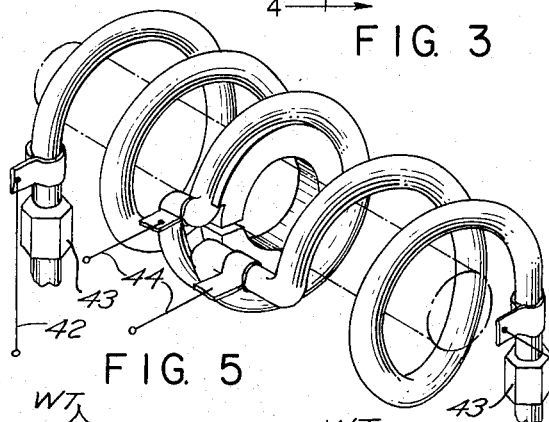
FIG. 5
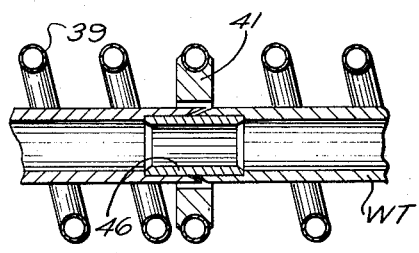
FIG. 6
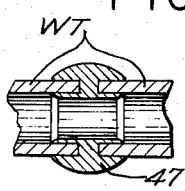
FIG. 8
FIG. 9
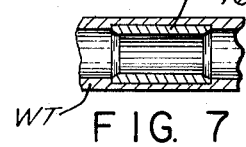
FIG. 7
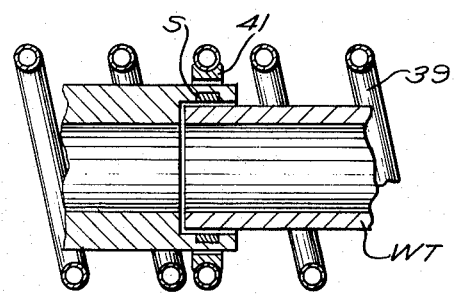
FIG. 22
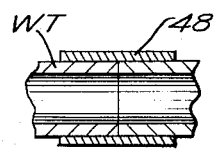
FIG. 10
FIG. 11
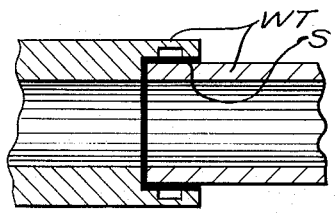
FIG. 23
INVENTORS
THEODORE J. MORIN
BY GEORGE R. PEACOCK
ATTORNEYS INVENTORS
THEODORE J. MORIN
GEORGE R. PEACOCK
BY
*Blair & Buckles*
ATTORNEYS

United States Patent Office 3,258,573
Patented June 28, 1966

3,258,573
WELDING AND FORMING METHOD AND
APPARATUS
Theodore J. Morin, 109 Powers St., Needham, Mass., and
George R. Peacock, 47 Marion St., Brookline, Mass.
Filed June 13, 1963, Ser. No. 287,569
2 Claims. (Cl. 219—9.5)

This invention relates generally to welding and forming, and more particularly to the welding and hot forming of metals and other electrically conductive materials. It provides a novel method and apparatus for welding and forming electrically conductive materials by a three phase heating, pressuring, and cooling treatment of the work.

Welding is defined as the joining of two or more pieces of material by applying heat, pressure, or both, with or without filler material, to produce a localized union through fusion or recrystallization across the interface.

Welding as practised hereunder is uniformly characterized by the application of heat.

Welding includes fusion (resistance, capacitance, etc.) welding, which is defined as welding without pressure, in which a portion of the base metal is melted. In fusion welding as practised hereunder the heating of the base metal is followed by the application of pressure to complete the weld.

Welding also includes forge welding, which is defined as welding by pressure or blows only. In forge welding as practised hereunder, the hot metal is welded without mechanical engagement with the work, by non-contact, electro-magnetic pressure.

Welding may also be performed hereunder with use of filler material, or bonding agent, such as in arc welding or torch welding, also brazing and soldering.

The forming to which this invention pertains is hot forming. Hot forming is defined as working operations such as bending, drawing, forging, piercing, pressing, and heading, performed above the recrystallization temperature of the metal.

Hot forming as practised hereunder includes the carrying out of these working operations over a range of temperatures above and also slightly below the recrystallization temperature of the metal.

Hot forming as here concerned is characterized by the lowering of the mechanical strength of the metal work, and is to be distinguished from cold forming, which is the forming of the metal work without heating, and hence at room temperature mechanical strength.

Hot forming includes forging, which is defined as plastically deforming metals, usually hot, into desired shapes with compressive force, and with or without dies.

In the practice of this invention forging involves first the heating of the metals, and then the subjecting of them to force which may be either compressive or expansive, and which is applied without contact with the metals.

The process of this invention is to be distinguished particularly from the prior art process of magnetic forming, a more recently introduced technique which is more fully to be described hereinafter.

Briefly, magnetic forming is a one step process in which the work does not first undergo heating, and in which the subjection of it to a magnetic field is characterized by the production of an uncontrollable heating effect on the work.

The welding and forming process of this invention, on the other hand, is a three step process, involving initial application of heat to the work, and in apply a pulsed magnetic field to the work which causes only a negligible additional heating effect.

The conventional techniques of forging, employing mechanical means for supplying the needed pressure or compressive force, are all affected by critical problems such as: contamination of the work piece; physical wear and deformation of the hammer and die; and physical shock and vibration damage to the equipment. With the conventional techniques also it is difficult to work in inert, reducing, or neutral atmospheres (to prevent oxidation), and on refractory metals. And it is impossible to operate the prior forging processes with, or more particularly to supply the needed pressure to, work pieces inside of usual vacuum or pressure vessels such as of glass or similar material.

Similar critical deficiencies must be listed also for the prior art techniques of welding. With respect to resistance or capacitance welding, there is the inability to work economically on large areas; and the difficulty in working in evacuated or pressurized enclosures such as of glass or other nonconducting materials. With respect to mechanical forge welding, there are the same difficulties as hereinbefore mentioned in reference to forging. And with respect to friction welding, there is the requirement of large mechanical rotations and complex mechanical equipment, and the similar difficulty in performing work in evacuated or pressurized vessels of nonconductive material.

This invention provides a novel, three step method of welding and hot forming electrically conductive materials, particularly, metal work pieces. In the first step of the method the work is heated by induction, raising its temperature in controlled manner and to effect the lowering of the mechanical (chiefly tensile) strength of, or the lowering of the mechanical strength of and melting of, the work. In the second step of the method the work is subjected to magnetic pressure, with negligible additional heating. The third step of the method is a cooling cycle in which the cooling of the work is regulated or controlled to minimize strains and homogenize grain structure.

The invention also provides new and improved apparatus for practising the welding and hot forming method hereof.

The method or process of this invention improves upon the prior art welding and hot forming methods or processes in numerous important particulars and in surprising, unexpected degree.

An important advantage of the invention is its speed; under the instant method the welding of metal pieces may be carried out in much less than heretofore possible. The induction heating of the invention method is quite rapid, consuming typically only a few minutes or seconds. The pressing or forming step of the invention is exceedingly fast; it may be completed in less than a millisecond. Thus, whereas to effect an arc weld of a three-inch stainless steel pipe joint in accordance with ASME specifications has heretofore required, say, 5 hours, this may be done hereunder in but a few minutes.

Further, under this invention the welding and hot forming operation is novelly made reproducible, or uniform. The invention process more particularly is one from which the human factor is eliminated, and which is completely automated, whereby it may be controlled to yield consistently perfect welds. Again in contrast to the long training and high skill required in conventional manual welding operations only the simple push-button manipulation of an automated device is needed for the welding as practised hereunder.

The invention makes it possible also to weld and hot form in cramped quarters, or confined spaces hitherto difficult to get at and impossible to work in. For the invention apparatus need merely be clamped on the work (for example, a pipe) whereas in the prior arc welding it was necessary in one way or another to go around the pipe. There is thus afforded an incalculable advantage in the construction and maintenance of submarine and other ships, and also plants, wherein literally tens of thousands of welds must be made both at the factory and in the field, in the performing of which tremendous cost and time savings are to be realized as just shown through the ease of application of the welding and hot forming process of the invention.

A further and important advantage of this invention is that there are produced by it only the highest quality welds, metallurgically speaking. Since the desired melting of the electrically conductive work at the joint is achieved by rapid and ample application of thermal energy or heat, a pure fusion weld of homogeneous structure and free from impurities is achieved, no secondary metal or filler element being required, and no flux being employed. Since the heating of the joint is followed by rapid application of pressure, the oxide surface film is broken to allow fusion to start, and the melt is forced into all the crevices and interstices of the work, eliminating the heretofore experienced voids (small holes or empty pockets in the metal) and inclusions (non-metallic material in a solid metallic matrix). Since the magnetic pressure is applied during solidification of the work to flow the melt into and force any detrimental gases out of the junction cavities and interstitial spaces, welding hereunder is completely free from the heretofore ineradicable problems of gaseous evolution, porosity, and shrinkage. Since concurrently with the solidification of the melt there is a virtually instantaneous application of pressure, and since all needed environment protection may be provided, chemical reactivity (decarburization, etc.) is minimized at the weld. One account of these and other advantageous characteristics and effects withal there is produced hereunder the soundest, strongest possible cast metal at the joint.

The new and improved welding result, metallurgically speaking, of the heating, pressuring, and cooling steps of this invention method may be summarized, then, as the production of an optimum joint or junction which is completely stress relieved, and which exhibits maximum strength and soundness together with maximum porositiy, shrinkage and segregation.

Another invention advantage is that with the avoidance of the use of secondary metal the problem of expansion coefficients at the junction is eliminated. This will be understood to make the invention process applicable to very high temperature and pressure joints such as required, for example, in steam power plants which operate at, say, 2,500 F., and 24,000 p.s.i.

A further advantage of the invention is that the combining in those processes of the impacting action of the magnetic pressure greatly advances the welding art also in respect to brazing and soldering. The pressure effect, or impacting action, serves more particularly to break the surface tension of the solder compound, thus initiating motion by capillary action; and it functions further to squeeze the liquid solder into the crevices and interstices of the heated joint.

A further advantage of the invention process is that it may be employed on production line work. More particularly, the process may be performed by a rapid, uniform "one shot" manipulation which permits the rapid passage of the work, as necessary to a production line operation, through the welding or forming station.

The invention method improves the art also by its solution of the heretofore very difficult problem of forging refractory metals, or ultra-high strength metals which are coming increasingly into vital use in space age applications, for their retention of desire mechanical properties, such as high strength, at high temperatures. The process hereof makes possible the forging of refractory metals such as molybdenum and tungsten without risk of embrittlement, by control of the temperature-pressure relationships to accomplish the hot forming with heating sufficient to achieve the necessary softening but not to exceed the recrystallization temperature. Further, when the refractory metals are raised under the invention to, say, 2,000° F. or more, their considerable (with tungsten, critical) brittleness at room temperatures is reduced, making these metals more workable in the invention process.

Another important advantage of the invention method is, then, a far more accurate control of temperature and pressure than heretofore thought possible in welding and hot forming operations. The temperature may be controlled as closely as it may be measured, say, to within 1° F. over a range up to 3,000° F.; this in contrast to the conventional arc welding wherein the temperature is not measured at all. The accurate temperature control provided by the invention allows the maintaining of optimum working temperatures unvaryingly and without dependence on the skill of an operator, and thus eliminates a heretofore unavoidable source of error or variation in welding and hot forming. For an optimum working temperature is a condition necessary to the producing of an optimum weld, and the ability to monitor the welding or forging temperature is what allows the accurate maintenance of uniform welding and forging conditions, and hence the consistent production of good welds and forgings.

Still another advantage of the invention process lies in its unique ability to perform the welds without introducing strains or weak points into the weldment. This is accomplished by the third or annealing step of the invention method, wherein there is had predetermined close control of the cooling of the work with regulation of the same to provide and maintain the desired slow cooling rate, or retention of the work within the desired temperature range for the desired time. In the annealing step more particularly the plastically deformed work is thermally conditioned, and may be reheated, to avoid the overlarge temperature gradients which might otherwise induce splitting or cracking of the resolidified alloy, and thereby also to rehomogenize the solid alloy, to relieve any strains induced in the work, and to eliminate segregation (non-uniform distribution of alloying elements, impurities, or microphases) in the metal.

Under this invention, then, the uncertain manual manipulations of the prior welding art are additionally improved upon by the provision and precise automatic control of an annealing step. This desired control of the rate of cooling, to the end that grain size is made homogeneous and the tendency to brittleness is minimized, is of great significance to applications where vibration problems are encountered, such as aircraft.

Yet another important advantage of the invention lies in the large cost and labour savings which are achieved in respect to the inspection of the work, and particularly of the welds. Heretofore all welds required to meet ASME specifications have had to be inspected, by radiographical, ultrasonic or other accepted techniques to determine the quality of the weld. Under this invention this requirement of inspection of each and every weld is done away with, in that, since the temperature, pressure and rate of cooling of the weld are closely controlled, only perfect and perfectly uniform welds are to be produced. Accordingly, in lieu of the costly weld-by-weld inspection required with prior methods, there needs be employed under this invention only an occasional or cursory sample check on the proper performance of the process.

Still other features and advantages of the invention process are its flexibility, or adaptability to a wide range of sizes and shapes of work pieces, and its economy, lending long life and low maintenance to the apparatus for performing it, and hence consuming virtually only the electric power supplied to that apparatus.

This invention process is to be differentiated from the prior art process known as magnetic forming, which is a cold forming process, as distinguished from a welding or a hot forming process such as here concerned. The following discussion of the principles of magnetic forming will, however, contribute to the proper understanding of this invention. Magnetic forming utilizes the pressure created by a transient or pulsed magnetic field. More particularly, the current pulse in a suitably designed coil induces a current of opposite direction in an insert placed within the coil. These currents of opposite direction will repel one another, thus exciting an equal but opposite force on both the coil and the insert or work piece. If a sufficient current is introduced and the two pieces are close enough, the forces may exceed the tensile strength of the work piece or the coil, and thus cause it to deform.

According to a different and more useful descriptive method, the magnetic field produced by a coil coupled to an energy source is said to have two distinct properties: (a) space distribution, and (b) time distribution, by which it may be likened to a two dimensional gas. Whereas the energy density and pressure of such a gas are identical, the pressure-energy density relation of the field may be expressed approximately as:

$$P \approx \tfrac{1}{2} B^2$$

where P is in pounds per square inch and B is in thousands of gauss. This pressure is a scalar, that is, it possesses no preferential direction in space. Thus while the amplitude or magnitude of a magnetic field determines the pressure it is capable of exerting on a conductor, it is the time dependent properties of a pulsed magnetic field which determine whether or not the capability of the magnetic pressure can be utilized.

When a magnetic field presses against a conductor the situation is analogous to that when a gas presses against a porous wall; in such event the gas distribution can change either by diffusion into the wall or by physical motion of the wall.

The property that determines whether an imbalance of magnetic pressure can exist across a conductor wall is the relation between the characteristic ringing frequency of the discharge system or circuit, and/or the frequency of the magnetic field, and the skin depth of the work piece. The skin depth is a measure of the distance the field diffuses into the work piece in a certain time. If the time duration of the pulse is such that the field has not penetrated the wall before reaching that value which corresponds to the pressure required to deform the work piece, then the field has a desirable time duration.

If one creates a large magnetic field similarly but with a long pulse duration such that the skin depth is several times the wall, then the field will diffuse through the wall at a rate comparable to the rise time of the field pulse, whereby the net magnetic pressure acting on the wall will be the difference between the pressures on either side of the wall. In such event the pressure may be and generally is unsufficient to perform the work.

The prior or conventional magnetic forming process, see for example U.S. Patent No. 2,976,907, granted March 28, 1961, to G. W. Harvey et al., is basically disadvantaged by the requirement that for a given metal of given size to be formed there must be developed, as by a flux concentrator or other magnetic field generating coil, a pressure sufficient to overcome the tensile strength of the metal. This requirement, and also considerations of cost, very seriously limits the practical application of the conventional magnetic forming process. Inasmuch as the magnetic field generator or coil must withstand the pressure which performs the work, and in view of the cost considerations in practical application, the magnetic field strength which has been attained with available materials and in commercial practice is about 300,000 gauss, which corresponds to a pressure of about 50,000 p.s.i. And the field strength has been raised in laboratory work only to about 600,000 gauss, which corresponds to a pressure in the range 100,000–200,000 p.s.i. Accordingly, magnetic forming is limited in practical or commercial application to materials having a tensile strength of less than 50,000 p.s.i., and is not usable with the many metals and alloys having higher tensile strength.

This is of particular significance with the refractory metals, such as tungsten and molybdenum, because they are very difficult to work by conventional cold forming. Showing that these metals cannot be worked either by magnetic forming, tungsten, for example, has at room temperature a tensile strength of about 220,000 p.s.i., requiring for its forming a too high magnetic field strength of about 700,000 gauss. In addition, tungsten is extremely brittle at room temperature.

The magnetic forming process as heretofore carried out is also uneconomic, or prohibitively expensive for all but the low tensile strength metals such as copper and aluminium. For example, with age hardenable stainless steel, type W, having a tensile strength of 195,000 p.s.i., the magnetic field required is 600,000 gauss. Assuming conservatively we may obtain the 600,000 gauss field from a 100,000 joule capacitor bank, and assuming conservatively a cost of 30 cents per joule for the capacitor bank, the cost of the apparatus for magnetically forming the type W stainless steel, for the capacitor bank alone, is $30,000.

To this capacitor bank cost must be added of course the cost of the power supply needed to charge the capacitor bank at a rate enabling it to supply the magnetic forming pulses at the desired rate.

A further critical shortcoming of the magnetic forming process arises from the interrelations of the pressure and heating effects as produced in that process.

In pulsed magnetic field generation there are to be considered two aspects of high intensity, rapidly changing magnetic fields by which the conductive or metal work pieces are classified, where the skin depth associated with the magnetic field is generally less than or equal to the metal thickness of the work piece. One classification, called $B_s$, is that field strength which will produce an effective mechanical pressure about equal to the tensile strength of the metal. The other classification, called $B_m$, refers to that field strength which will cause melting of the metal. These classifications are a property of every metal, and are independent of frequency, as long as the frequency approximately meets the stated skin depth criteria.

The pulsed fields as generated in conventional magnetic forming practice cannot be controlled to alter the $B_s$–$B_m$ relationship; that is, the production of heating effects, as a corollary of the building up of pressure forces, is uncontrollable.

It will be apparent then, that only those metals for which $B_m$ is greater than $B_s$ can be formed by magnetic forming techniques. All those metals for which $B_m$ is equal to or less than $B_s$ cannot be worked by conventional magnetic forming, because the surface of the metal work piece will melt, and the coincident mechanical pressure will then cause irregular motion of the melt and produce an undesired irregular, mottled surface.

Consider, for a common and often forged example, steel, which in common allow forms has a range of tensile strength corresponding to a $B_s$ up to 700,000 gauss, from which it will be seen that an attempt to work such metals would require magnetic fields of extremely high strength. Further, in such alloys generally $B_m$ is about equal to $B_s$, which is to say, as just explained, that these alloys generally cannot be magnetically formed.

This problem cannot be solved by building a more powerful magnetic field generator. To attempt use of higher magnetic fields would only increase the uncontrollable heating and melting of the metal surface, and the accompanying displacement or splashing of the melted steel.

It will be seen, then, that since there is a limit to the allowable increase in the temperature of the metal, and since the heating associated with the pulsed magnetic field is uncontrollable, the scope or variety of metals to which the conventional magnetic forming may be applied is seriously limited, specifically, to those metals whose $B_m$ is greater than their $B_s$; metals, that is, which deform before they melt under the uncontrollable heating.

An important feature of this invention is then, its ability to weld and hot form with a variety of materials and over a range of applications far greater than that of the prior art magnetic forming process. In the hereinbefore mentioned case of tungsten, for example, the temperature of the work will under the invention be raised to, say, 2400° F., lowering the tensile strength of the tungsten to, say, 45,000 p.s.i., or bringing its $B_s$ to considerably below its $B_m$, and enabling the metal to be formed with a practicable field of only about 300,000 gauss.

Again, whereas magnetic forming may be carried out with only those metals whose $B_m$ is greater than their $B_s$, under this invention every work piece is first treated to lower its tensile strength to the point where its $B_s$ is less than its $B_m$. Thus the instant process is distinguished by its applicability to the very important ferrous alloys, including most of the irons and steels, for which alloys $B_m \approx B_s$.

Another invention feature is that whereas in magnetic forming the applying of the pulsed magnetic field to the work is accompanied by an uncontrolled heating effect seriously restricting the usefulness and application of that prior process, under the instant process the heating effects of the pulsed field are so minimized they may be ignored. That is, in the initial work heating hereof which lowers the strength of the metal to a level at which the same may be overcome with moderate fields, the $B_s$-$B_m$ relationship is so altered that a magnetic field to supply the pressure then needed will not approach the $B_m$ of the metal, and the forming of the work may be done without appreciable additional heating and so at predetermined, optimum temperatures. It will be appreciated also that due to its heating effect the prior magnetic forming operation necessarily subjects the weld to high stresses, and requires for the relief of the stresses a further work treating operation with a different apparatus. Whereas under this invention the welding and forming may be controlled to render the weld fully annealed (i.e. relieved) in the same process.

A related advantage of this invention concerns the extraordinary cost savings to be had under the instant process as against the magnetic forming, in the forming of high and low strength materials alike. Consider for example the aforementioned age hardenable stainless steel (type W) having a tensile strength of 195,000 p.s.i. and requiring for its forming at room temperature a magnetic field of 600,000 gauss. Hereunder, the type W stainless steel is heated to 1600° F., at which it has a tensile strength of less than 10,000 p.s.i. and requires a magnetic field of less than 140,000 gauss. To derive the cost savings to be achieved by this preheating of the metal to 1600° F., we observe that the maximum magnetic field strength of a given coil is proportional to the square root of the energy storage supply, thus:

$$H \alpha (E)^{1/2}$$

Assuming the same proportionality constant at 600,000 gauss as at 140,000, then:

$$\frac{600,000}{140,000} = \frac{E_6^{1/2}}{E}$$

$$18.2 = \frac{E_6}{E} \text{ or } E = 0.055 E_6$$

From which it follows that by increasing the temperature as just indicated we can reduce the required capacitor bank energy storage requirement by as much as 95%. Employing the same 30 cents per joule for the capacitor bank and 100,000 joule bank for a 600,000 gauss field cost factors as hereinbefore mentioned, it will be seen that this lowers the capital cost of the bank to $1500.00, for a tremendous saving of $28,500.00 per unit (less the cost of the R.F. generator, which will generally be balanced by the additional cost savings in respect to the power supply needed).

For carrying out the invention process there is herein provided also a new and improved equipment or apparatus.

One apparatus feature of the invention is the means for precise automatic control of the timing of the pressuring in sequence to the heating of the work, and as well of the temperature at which the second or pressuring step of the process is carried out. To that end a temperature sensing device is arranged to actuate the pressure generating means when the selected work temperature is attained. It may also be employed in the third step of the invention process to govern control by the heating means of the rate of cooling of the work.

Another and a main feature of the invention apparatus is the provision of the same common conductor or coil apparatus for carrying out the induction heating, magnetic pressuring, and controlled cooling steps of the invention process.

The use of the same common conductor or coil for carrying out both the induction heating and magnetic pressuring steps yields important additional additional advantages to the invention method. The welding and hot forming may be done without the necessity of moving either the work piece or the coil, and with a minimum interval between the heating and pressuring, and therefore with pressure application at the optimum time. The minimum time lapse between the heating and pressuring enables further and more particularly a precise control of the welding temperature, the adjustment of the heating rate to reduce gaseous evolution, the regulation of the pressure to achieve bonding over the desired area, and the annealing of the work to get the strongest stress relieved joint. The use of the common heating and pressuring means allows further that the welding and forging be done in a controlled (neutral, reducing) atmosphere to eliminate oxidation.

Still other advantages of the heating and pressuring means are that it may be utilized to help align the work pieces, and that its use enables the process to be carried out with a minimum of human or operator effort, with no interchange of work pieces, and with but one set-up of the apparatus, and thus with the risk of human error virtually eliminated.

The use of the novel work coil as just described will be understood to impart or contribute to further important advantages of the invention apparatus, namely, its adaptibility to various sizes and shapes of work piece, its portability and simplicity, and its capacity for economical transporting to and ready use in different and difficult locations, and for complete carrying out of the joining operation as the work progresses through only one station on the production line.

The novel work coil of the invention will be understood further and more particularly to have mechanical strength to withstand the shock of the pulsed magnetic field, and to be equipped also for being cooled sufficiently to retain low temperature mechanical properties while being subjected to the intense alternating currents of induction heating. The coil is further characterized by eelctrical properties adapting it to both induction heating and magnetic field generation sufficiently to perform the desired work. The coil of the invention additionally has the proper geometric shape to provide the spatial variation or concentration of gradients in the induction heating fields and transient magnetic fields, or in other words the working pressure distribution as appropriate to the welding and hot forming of work of the particular size and shape involved.

The invention will be further described with reference to the accompanying drawings in which:

FIG. 3 is a longitudinal section of a work coil of the invention as employed in the butt welding of tubular work pieces;

FIG. 4 is a transverse section along the line 4—4 of FIG. 3;

FIG. 5 is an assembly view in perspective of the FIG. 3 and 4 form of the invention work coil;

Figure 12:
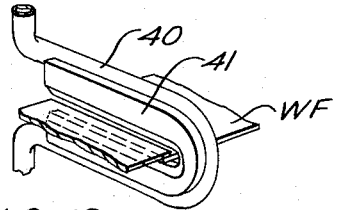
Figure 13:
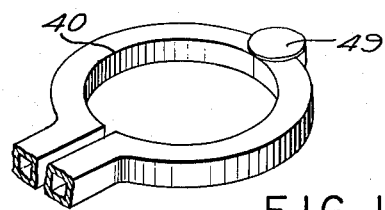
Figure 14:
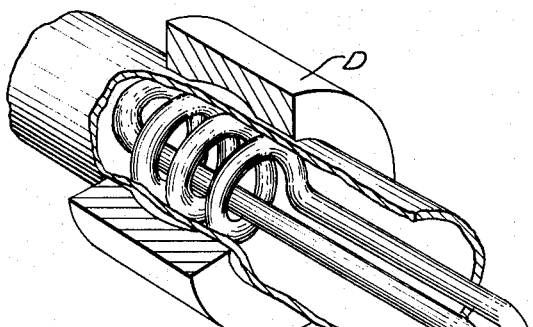
Figure 16:
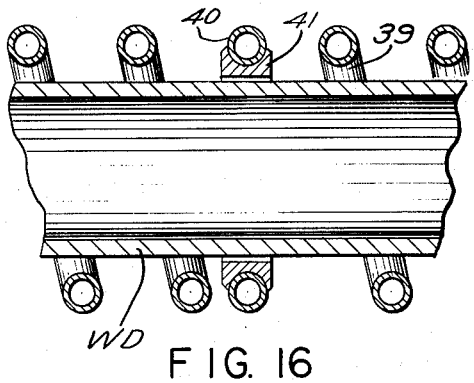
Figure 15:
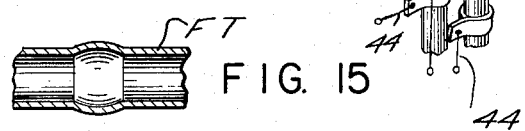
Figure 17:
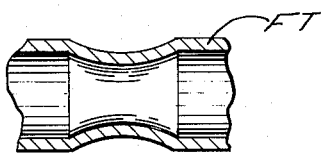
Figure 18:
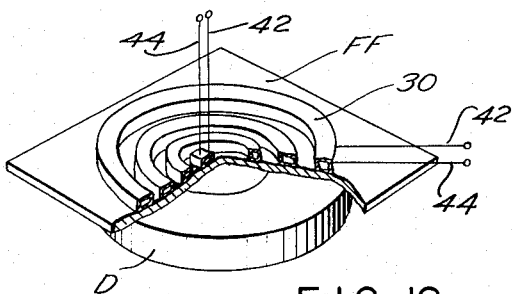
Figure 20:
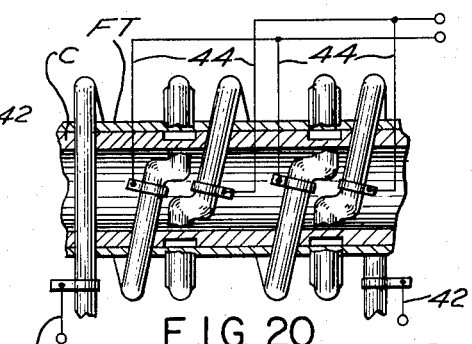
Figure 19:
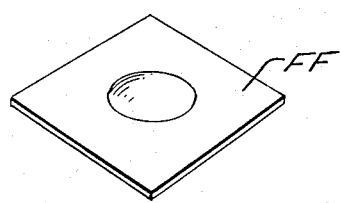
Figure 21:

FIGS. 6–7, 8–9, and 10–11 illustrate the use of the invention method and apparatus in various other welding applications, showing the parts before and after the performing of the weld in each case;

FIG. 12 illustrates the applicability of the invention process to the joining of metal work pieces of flat sheet or strip form;

FIG. 13 illustrates a form of the invention coil which is specially adapted to the welding of parts in relatively inaccessible locations;

FIG. 14 is a cutaway assembly view showing the use of the invention in hot forming, with the coil applied inside and a die employed outside the work;

FIG. 15 shows the work piece of FIG. 14 after forming;

FIG. 16 illustrates hot forming with the coil mounted outside and used to compress the metal work;

FIG. 17 shows the FIG. 16 work pieces after forming;

FIG. 18 illustrates the use of the invention process in, and the form of the coil adapted to, the forming of flat work;

FIG. 19 shows the FIG. 18 work piece after forming;

FIG. 20 shows the forming under the invention of a composite work piece;

FIG. 21 shows the FIG. 20 work piece forming; and

FIGS. 22 and 23 illustrate the application of the invention to soldering and brazing, a socket joint with an internal solder ring being shown before and after welding.

As hereinbefore pointed out the instant invention provides generally for the welding and forming of electrically conductive workpieces by a unique combination of the steps of heating the work by induction, or by means of a time varying electromagnetic field; then joining or forming the work under non-contact pressure, or by subjecting the work to one or more transient magnetic field pulses; and then allowing the work to cool in controlled manner.

Figure 1:
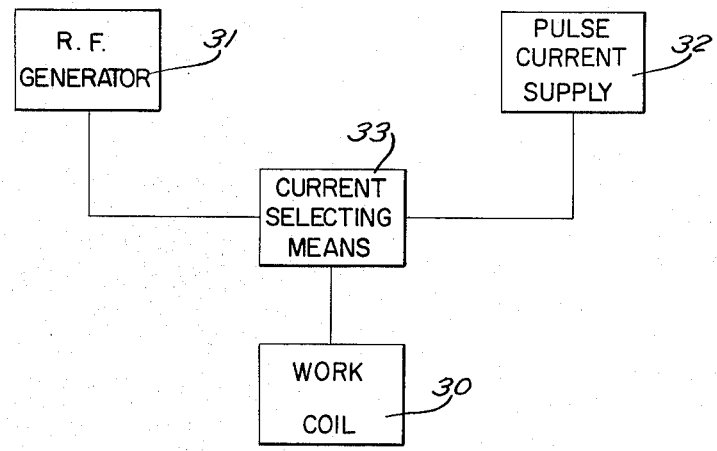
FIG. 1 is a block diagram of a basic welding and forming network or system of the invention.

A basic apparatus or system for carrying out the welding and hot forming process of the invention is shown in FIG. 1 to comprise a time varying electromagnetic field generating means or work coil 30, which is coupled to a radio frequency generator 31 and a pulse current supply 32 through a current selecting means 33, which may be a switch or switch and filter device, by which the oscillator 31 and pulse current supply 32 are controlled for successive or non-interferent energizing of the work coil 30.

In accordance with the invention the coil 30 is employed both as an induction heating means and as a pulsed magnet. The coil 30 is thus characterized novelly by the combination of properties of: strength to withstand the shock of the pulsed magnetic field to which the work is subjected; R.F. generator output matching inductance and low hysteresis loss for maximum efficiency ability to retain room temperature mechanical, electrical, and thermal properties under the intense induction heating; and geometry as predetermined for the desired magnetic field shape and size.

A work coil having the foregoing characteristics may comprise for example a hollow copper tube of round, square, or other cross-section, shaped conformantly to the work, or more particularly to the region of welding or forming, fitted for flushing cooling water therethrough, and reinforced in the portion or length through which the transient magnetic field pulse is to be discharged.

To describe now the invention embodiments and uses as herein disclosed, in FIGS. 3–13 of the drawings are shown welding applications of the invention, commonly to tubular work but including also flat pieces, noting that with the tubular members the welding may be of either butt or socket joints of the pipes or tubes. For the application to tubular work the conductor 30 is seen to comprise a tubular coil or helix having a series of spiral wound turns 39 extending along the length of the work or work pieces to be heated, and incorporating one or more lateral or transverse (to the work) turns 40 merging with the adjacent spiral wound turns 39 through short longitudinal tubing lengths 40a. The one or more transverse turns or loops 40 are constructed and arranged more particularly for positioning in uniform proximity to the joint or weld, or region of the work to be subjected to the magnetic pressure, and may, as in FIGS. 3–6 and 12, be reinforced by a bronze or other more rigid metal ring 41, whereby the conductor length 40 is enabled to withstand the magnetic field pressure.

In accordance with the invention, the conductor 30 is of hollow construction and is fitted at its ends with connections 43 for supply and return of a fluid coolant, which may be a liquid such as water, whereby there may be preserved to the conductor under the very high induction heating temperatures, its room temperature mechanical, electrical, and thermal properties. Also applied to the ends of the coil 30 are electrical connections or leads 42 run to the R.F. generator 31 whereby that may energize the entirety of the conductor.

Further in accordance with the invention, the pulse current supply 32 is connected as by the leads 44 directly across the conductor 30 portion (or portions), herein the transverse turn 40, which is utlized for applying the magnetic pressure to the work.

It will be understood that various forms of secondary members may be employed under the invention to facilitate the welding operation. FIGS. 3 and 4 show a welding ring 45 of generally triangular cross section such as appropriate for use with pipes having the indicated oppositely tapered ends. FIGS. 6 and 7 show a welding ring or insert 46 such as may be employed with pipe ends having a mating taper, and which functions to prevent the collapse or caving in of the pipe ends at the joint, being for that purpose made of a material having a high tensile strength at the melting temperature of the pipes, whereby it remains rigid through whereas the pipe ends fuse together in the welding, FIG. 7.

In the butt welding application illustrated in FIGS. 8 and 9 a secondary member 47 is shown as having a configuration adapted both to center the pipe ends and to reinforce the joint from within and without. In this case the secondary member 47, in contra-distinction to the insert 46, will be of a material calculated or selected to fuse together with the pipes WT on the heating of the same to the welding or fusion temperature, as indicated in FIG. 9. And in the application represented by FIGS. 10 and 11 the secondary member is seen to comprise a surrounding sleeve 48, again of a material to fuse together with the pipe ends WT in a continuous and perfectly homogeneous weldment, FIG. 11.

FIG. 12 illustrates the application of the invention to the welding of flatwork, and shows a conductor of general U-shape and comprising only the single turn 40 which may be reinforced as at 41, to which single turn 40 the induction heating and pulse current leads as well as the coolant fittings are attached. The flattened or U-shape of this FIG. 12 conductor will be seen to afford it the desired uniformly close spacing from the workpieces WF along the transverse length of the lap joint between the flat sheets or strips here concerned.

FIG. 13 shows a special purpose, single turn embodiment of the conductor having a square cross section, or flat inner wall, and a fluid-electrical conducting hinge 49 dividing it into halves which may be opened to receive and then closed to engage around a pipe or other work piece while in place, or inaccessible from the end. The conductor or coil halves may have the generally half round configuration shown, or any other configuration as may conform to the work, and may project at their free ends by parallel arms as shown or otherwise as described for convenient fitting of the electrical and coolant connections. It will be seen that this FIG. 13 form of the coil is of great advantage in repair work, particularly in relatively inaccessible locations.

In the use of the invention apparatus for the butt or socket welding of tubular members or pipes as illustrated in FIGS. 3–11 the pipe joint is positioned or centered within the reinforced turn of the coil, and the pipes are then rigidly fixed in place, by clamping them either directly ot the coil or to a rigidly mounted support which is in turn fixed to the coil. Supply and return connections to a source of cooling water are also made by the fittings 43, and the water is turned on to flush through the coil and thereby to preserve to the coil its room temperature characteristics. The R.F. generator is then turned on, energizing the coil 30 and thereby heating the workpieces WT, thereby utilizing the transformer action of the coil and work piece combination to induce high frequency surface currents in the work, heating the desired zone or region of the work circumferentially in uniformly controlled manner and to a predetermined temperature level.

In the induction heating then, the radio frequency oscillator or motor generator 31 energizes the inductor or coil 30 so as to produce an alternating magnetic field or flux, which in turn induces an electromagnetic force and hence eddy currents in the conductive material or work. These eddy currents continue with the resistance of the work to produce the desired heating.

In the initial work heating step it will also be understood, that the proper operation of the induction heater depends upon man variables, and the characteristics of the induction heater will be determined for each application. Fore example, the generator frequency will be selected or adjusted to concentrate the coil current in the work piece skin depth, or in other words, for the desired heating depth, according to the metal or alloy composition of the work piece.

It is here again pointed out that the induction heating as just described is effective to lower the $B_s$ of the electrically conductive material without causing any appreciable reduction in its $B_m$, so that it is free from uncontrolled heating effects when subjected to the reduced pulsed current fields required to work it. Put another way, the novel process of this invention is by elevating the temperature of the material so to alter its characteristics that the subsequent, suitable application of magnetic pressure is accompanied by negligible additional heating effects.

Figure 2:
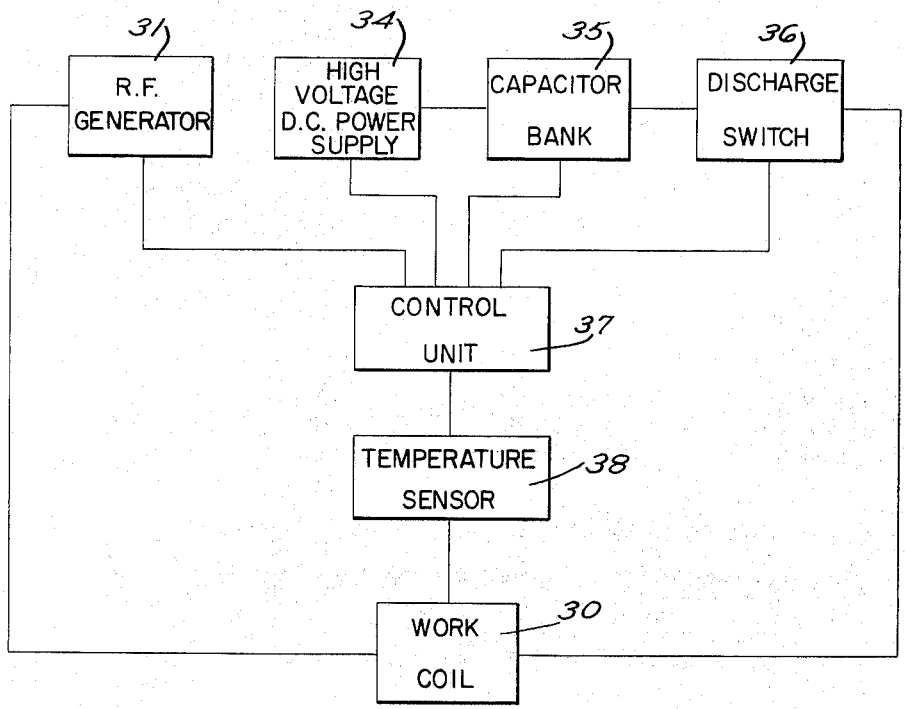
FIG. 2 is a block diagram of an automated embodiment of the system.

Referring now to FIG. 2 wherein is shown an automated system for carrying out the invention, the pulse current supply may comprise a capacitor bank 35, which may be charged by a power supply 34 and discharged by a switch 36 actuated by a control unit 37 governed in turn by a temperature sensing means 38. With the temperature sensing means 38 the attaining of the desired welding and forming temperature can be precisely measured, and one or both of the induction heating and pulse current supply means can be automatically actuated through the control unit 37 to initiate the second or pressuring step of the process immediately or simultaneously upon the attaining of and so with retention of the working temperature. That is, along with the actuating of the pulse current discharge system or circuit the R.F. generator 31 may or may not be turned off or electrically disconnected from the coil 30.

In the next or second step of the process the energy storing means or capacitor bank 35, which will have been charged to a desired voltage by the D.C. power supply 34, is switched into the work coil 30, the control unit 37 acting, again, in response to the means 38 to close the discharge switch 36 so as to pass the desired large current surge or pulse through the coil. The current pulse may vary in time duration from a few to many millionths of a second, depending upon two parameters, namely, the magnetic skin depth of the material at the temperature at which it is being worked, and the thickness of the metal being worked.

The described pulse, or fast changing currents, will be understood to generate a fast changing magnetic field of the same order of intensity and which has associated with it a corresponding mechanical force or pressure effect (or up to hundreds of thousands of pounds per square inch) which acts on any conducting material in the field, to accomplish the desired welding and hot forming action.

In the case of the joining or welding application of the process the range of temperatures at which the second or pressuring step of the process is carried out will of course be in the melting or fusion range of the metal being welded. And in any case as just indicated, since it is accomplished with a magnetic field equivalent to the $B_s$ of the metal concerned only as considerably reduced below the substantially unchanged $B_m$ of said metal, the pressuring step may be carried out without uncontrolled or significant additional heating of the work, and so at the desired and optimum work temperature.

Upon completion of the joining or welding of the metal work pieces, and in the third or controlled cooling step of the invention method, cooling of the work is controlled or regulated for the desired effect, which may be to anneal the work. This may require turning the induction heater on and off one or more times at reduced power, as may be done automatically through the temperature sensor 38 and control unit 37 combination, which may be programmed to hold the cooling work pieces within a predetermined temperature range or gradient for a predetermined time period or interval.

To further illustrate the application of the invention process to tubular metal parts: for welding, say, lead pipes of ½″ O.D. there may be employed a conductor comprising a coil of five turns of ⅛″ O.D. copper tubing, and with the center turn reinforcement being a silver plated bronze ring. To heat the lead pipes there may be utilized an induction heater delivering 500 watts of R.F. power at a frequency of 390 kilocycles, which will raise the temperature of the lead pipes to the melting point, at which the induction heater may be turned off. In the second or pressure applying step of the process a capacitor bank having a capacitance of 60 microfarads and charged to a voltage of 3500 volts will be found, upon discharge through the reinforced turn of the coil, to generate a magnetic pressure to cause a fusion bond between the two pieces of pipe at the indicated welding temperature. Exemplifying the fast heating and instantaneous pressuring by which the invention is distinguished, these two steps may be performed in the given example in a combined time of about ninety seconds.

An important use and application of this invention process and apparatus is to hot forming, as illustrated in FIGS. 14–21.

FIG. 14 shows that the coil may be mounted inside and for expansion forming of the work, which may be a tubular member or pipe FT, and that the pipe may be forced outwardly against a surrounding die D.

FIG. 15 shows the conforming of the pipe FT as hot formed to the die D.

In FIG. 16 a coil 39 is arranged external to the work and to apply compressive force thereto, and so to effect the hot-forming by contraction or reduction of the pipe FT, as shown in FIG. 17. In this the pressure applying portion of the coil is positioned centrally of the length of work to be formed, and a single reinforced turn 40 as shown will suffice for the length indicated.

The FIG. 16 coil resembles that of FIGS. 3–5, and the FIG. 14 coil departs therefrom in that it omits the reinforcing ring 41 and terminates in two straight lengths extending at one or the same end (to which the coolant connections and the induction heater and pulse current leads are attached) whereby the coil may be inserted through the exposed or open end of the pipe.

FIGS. 18 and 19 illustrate the application of the invention to the hot forming of flat stock, with the work being placed between a coil 30 of suitably flat or spiral wound configuration and a die D the conforming to which shapes the work as desired, herein to a dished configuration, FIG. 19.

The invention method may be employed also for carrying out the hot forming of composites, for example the double walled tube of FIGS. 20, 21, wherein one of the members of the composite (here an inside tubular one) is of a non-conducting, say, a ceramic, material, and the other member of the composite (here an outside tubular one) is an electrically conductive member, and may be more particularly, a high tensile strength material such as cannot be worked by cold or magnetic forming. The exemplary composite of FIGS. 20, 21 has a ceramic (or other nonconducting) liner C provided with recesses or inlays into which the conducting sleeve FT is hot formed in the described manner and with a coil like that of FIGS. 3–5 except that it may comprise a plurality of the reinforced turns 40, with one positioned at each forming radius or region.

Further in respect to the hot forming of composite structures incorporating electrically conductive materials, it will be understood that where the metallic element is the liner and is to be expanded into inlays in the inner wall of a ceramic sleeve the coil to be selected will be one adapted to be received inside the work, such as that shown in FIG. 14. In both instances the coil 30 may have as many pulse discharge turns as there are inlays, and the pulsed current connections which are applied across the individual turns may be connected commonly in parallel as shown in FIG. 20.

The same steps as above described for the welding are followed in the practice of the invention method for hot forming, except that the initial heating step will of course be regulated to raise the temperature of the metal work piece to a somewhat lower lever than that which is appropriate for fusion welding.

In the operation of the coil for hot forming of electrically conductive and including high tensile strength materials, the induction heater is turned on and the work is heated until the $B_s$ is reduced to a value measurably below, and generally considerably below, the $B_m$.

With respect more particularly to the composites, the conductive member is heated to lower its tensile strength to a point below the breaking strength of the non-conducting member. Upon reaching the predetermined temperature the capacitor bank 34 is switched as before into all turns of the FIG. 14 coil and across turn 40 of the FIG. 16 coil, and the hot material or metal is very rapidly formed to its desired shape. After the hot forming is completed the work undergoes controlled cooling as described, with use as needed of the heater 31 as controlled by the sensor 38 to regulate the rate of cooling as for annealing or stress relief of the work.

As a specific illustration of the hot forming, a piece of ¾″ O.D. iron pipe may be formed with a three turn helical coil made of ¼″ copper tubing having a ⅞″ I.D. To heat such work an induction heater will be selected to deliver 7 kilowatts to the coil at a frequency of 2 megacycles per second which will be found to raise the iron to the forging temperature. To form the pipe a capacitor bank of, say, 60 microfarads capacitance, and charged to, say, 3000 volts will be found, upon discharge through the coil, to generate a sufficient magnetic pressure. The deformation of the piece will be shown by the reduction of the outside diameter of the iron pipe to be observed in the vicinity of the coil. The rapidity of the heating, and the immediate and instantaneous nature of the pressuring, as may be done under this invention, is shown by the fact that in this hot forming example, the two steps may be completed in but about two minutes.

Yet another important application of the invention is to soldering and brazing. Referring now to FIGS. 22 and 23 in which is shown an exemplary coupling of pipe ends WT interfitted in a socket joint, and wherein a ring of solder S is received in a blind or interior recess in the female member. It will be appreciated that under the invention the heating of the work by the induction heater 31 to the point of melting the solder is unhindered by the interposing of the female pipe end between the ring S and the coil 39. Further, the effect of the subsequent pressuring step of the process as accomplished again by the discharge of the capacitor bank 35, is to force or flow the solder out of the FIG. 21 recess into and so as to completely seal all the openings or passages between the pipe ends as indicated in FIG. 22.

It will be appreciated that in soldering and brazing the work need not be raised to as high a temperature as in fusion welding, the pieces to be joined requiring to be heated only to the lower (than the base metal) flow point of the brazing or soldering alloy, before application of the pulsed field. Further, a very low field strength, or the equivalent, say, of less than 1 pound per square inch, will suffice for the pressure effect, or impacting action, by which more particularly the magnetic field breaks the surface tension of the solder compound and thus induces flowing of and by capillary action of the melted alloy. In this, as just mentioned, the force of the magnetic field pressure squeezes the solder into every crack and crevice of the joint, and so completely closes or seals the joint.

Our invention is not limited to the particular embodiments thereof listed and described herein, and we set forth its scope in our following claims.

We claim:
1. In the welding and forming of metal pieces the method which comprises the steps of fixing the work in desired positional relation to a work coil, energizing the work coil with an induction heater in controlled manner to raise the work to a predetermined temperature, detecting the raising of the temperature of the work to the desired level, developing in the coil a magnetic field calculated by its mechanical pressure to predeterminedly work the pieces, and then cooling the pieces in controlled manner and by re-energizing the heater at low power and as necessary to maintain the work in the desired temperature range for the desired period of time, whereby to relieve strains and produce homogeneous grain structure in the work.

2. Apparatus for welding and forming of metal work by successive application of heat and pressure comprising a conductor constructed and arranged to develop upon its energizing a magnetic field of predetermined size and shape, means for cooling the conductor, means for fixing the work in predetermined positional relation to the conductor, an induction heater coupled to said conductor for energizing it to heat the work at a predetermined rate, means for discharging a large transient electrical pulse of predetermined magnitude to said conductor, a power supply for said pulse discharge means, and means operable subject to the heating of the work to a predetermined temperature for automatically switching on the sequential pulse discharge to effect the desired welding and forming of the work.

References Cited by the Examiner
UNITED STATES PATENTS

| | | | |
|---|---|---|---|
| 2,673,276 | 3/1954 | Allardt | 219—8.5 |
| 2,976,907 | 3/1961 | Harvey et al. | 153—10 |
| 3,088,200 | 5/1963 | Birdsall et al. | 29—421 |
| 3,092,165 | 6/1963 | Harvey | 153—2 |
| 3,126,937 | 3/1964 | Brower et al. | 153—10 |

RICHARD M. WOOD, *Primary Examiner.*